(12) United States Patent
Auf Der Heide et al.

(10) Patent No.: US 8,286,549 B2
(45) Date of Patent: Oct. 16, 2012

(54) APPARATUS FOR PROCESSING SPICE-CONTAINING FILMS IN THE PRODUCTION OF SAUSAGE AND CHEESE, AND SAUSAGE AND CHEESE PRODUCTS PRODUCED THEREWITH

(75) Inventors: Dirk Auf Der Heide, Alfhausen (DE); Martina Koenig, Wiesbaden (DE)

(73) Assignee: Kalle GmbH, Wiesbaden (DE)

( * ) Notice: Subject to any disclaimer, the term of this patent is extended or adjusted under 35 U.S.C. 154(b) by 395 days.

(21) Appl. No.: 12/579,031

(22) Filed: Oct. 14, 2009

(65) Prior Publication Data

US 2011/0005406 A1 Jan. 13, 2011

(30) Foreign Application Priority Data

Jul. 10, 2009 (DE) ...................... 20 2009 009 461 U

(51) Int. Cl.
*B65B 9/10* (2006.01)
(52) U.S. Cl. ............. 99/450.7; 99/494; 53/558; 53/545; 53/450; 264/563
(58) Field of Classification Search .................... 99/494, 99/450.6, 450.7; 53/450, 451, 514, 516, 53/558, 545; 425/387.1, 391, 114, 404; 264/564, 264/563

See application file for complete search history.

(56) References Cited

U.S. PATENT DOCUMENTS

| | | | |
|---|---|---|---|
| 4,528,225 A * | 7/1985 | Hutschenreuter et al. | 138/118.1 |
| 4,563,231 A * | 1/1986 | Porrmann et al. | 156/90 |
| 6,326,039 B1 * | 12/2001 | Schiffmann et al. | 426/238 |
| 7,059,102 B2 * | 6/2006 | Hanten | 53/450 |

FOREIGN PATENT DOCUMENTS

DE 103 57 688 A1 2/2005

* cited by examiner

*Primary Examiner* — Reginald L Alexander
(74) *Attorney, Agent, or Firm* — ProPat, L.L.C.

(57) ABSTRACT

An apparatus for stuffing a pasty food that includes an applicator sleeve arranged between the inlet end and the outlet end of a stuffing tube. At least a portion of the applicator sleeve surrounds the stuffing tube about part or its complete circumference and the applicator sleeve supplies one or more strips coated and/or impregnated with transferable additives to the stuffing tube, with the strips being ultimately applied to the pasty food. The innovation further relates to a foodstuff in a tubular casing (e.g. sausage skin), in which at least one strip is arranged between the foodstuff and the surrounding casing, the strip being coated and/or impregnated with at least one transferable additive.

17 Claims, 8 Drawing Sheets

APPARATUS FOR PROCESSING SPICE-CONTAINING FILMS IN THE PRODUCTION OF SAUSAGE AND CHEESE, AND SAUSAGE AND CHEESE PRODUCTS PRODUCED THEREWITH

CROSS-REFERENCE TO RELATED APPLICATIONS

This application claims priority to German Patent Application 20 2009 009 461.8 filed Jul. 10, 2009 which is hereby incorporated herein by reference in its entirety.

FIELD OF THE INVENTION

The innovation relates to an apparatus for stuffing a pasty food, preferably a meat, sausage or cheese mass, into a sausage skin using a stuffing tube with an inlet end and an outlet end, between which a sausage skin material stock which is provided for a plurality or multiplicity of sausage skin sections which are to be stuffed is arranged, compressed in the longitudinal direction, on the stuffing tube, the apparatus comprising an applicator sleeve which is arranged between the inlet end and the outlet end, surrounds the stuffing tube about part or the complete circumference and is intended for one or more strips coated with additives for the foodstuff in question. The innovation furthermore relates to a foodstuff in a tubular casing (sausage skin), in which at least one strip is arranged between the foodstuff and the surrounding casing, said strip being coated and/or impregnated with at least one transferable additive.

BACKGROUND OF THE INVENTION

Apparatuses for stuffing a meat or sausage mass into sausage skin sections for subjection to a subsequent treatment process, such as a maturing and/or cooking process, are well known. For a subsequent treatment of the food, in which additions, such as spices, act from the outer side and impart flavors to the meat or sausage mass, it has generally been required to apply the spices manually after the sausage skin has been stuffed. For this purpose, the sausage skin has been sliced in the longitudinal direction immediately after being stuffed in order to make the outer side of the meat or sausage mass located therein accessible. After the spices have been applied, the sausage skin is closed again.

As an alternative to the above procedure, a strand of the particular meat or sausage mass is laid in a pressing mold which has been lined beforehand with a sausage skin section open on the longitudinal side. A strip coated with spices on the side facing the meat or sausage mass is placed onto the mass in the pressing mold. The sausage skin which is open on the longitudinal side is closed and the contents of the pressing mold compacted by means of a punch.

The abovementioned manual processes are awkward and time-consuming.

DE 103 57 688 describes an apparatus which permits a strip coated with additions to be introduced continuously during the stuffing of a meat or sausage mass into a skin, it not being required to open the sausage skin in the longitudinal direction. In the apparatus, the strip which is coated with additions is fed in through the outer chamber of a double-walled stuffing tube. As the strip is fed in, friction against the walls of the stuffing tube causes some of the additions to be detached, some of which, in turn, remain stuck to the walls and increasingly clog up the chamber. In order to prevent clogging-up, and for hygiene reasons, the chamber has to be cleaned at regular intervals. However, the cleaning of the tubular chamber is difficult because of the small width thereof in comparison to the length and requires the use of a suitable tool or of a cleaning bath.

SUMMARY OF ADVANTAGEOUS EMBODIMENTS OF THE INVENTION

The innovation is therefore based on the object of providing an apparatus in which, at the same time as the stuffing of the sausage skin section drawn off from the stuffing tube, a strip which is coated with spices or other food additives can be fed in, and the apparatus is to be of simple construction and the surfaces in contact with the strip freely accessible.

BRIEF DESCRIPTION OF THE DRAWINGS

The innovation is explained in more detail below with reference to drawings, in which.

DETAILED DESCRIPTION OF ADVANTAGEOUS EMBODIMENTS OF THE INVENTION

Figure 1:
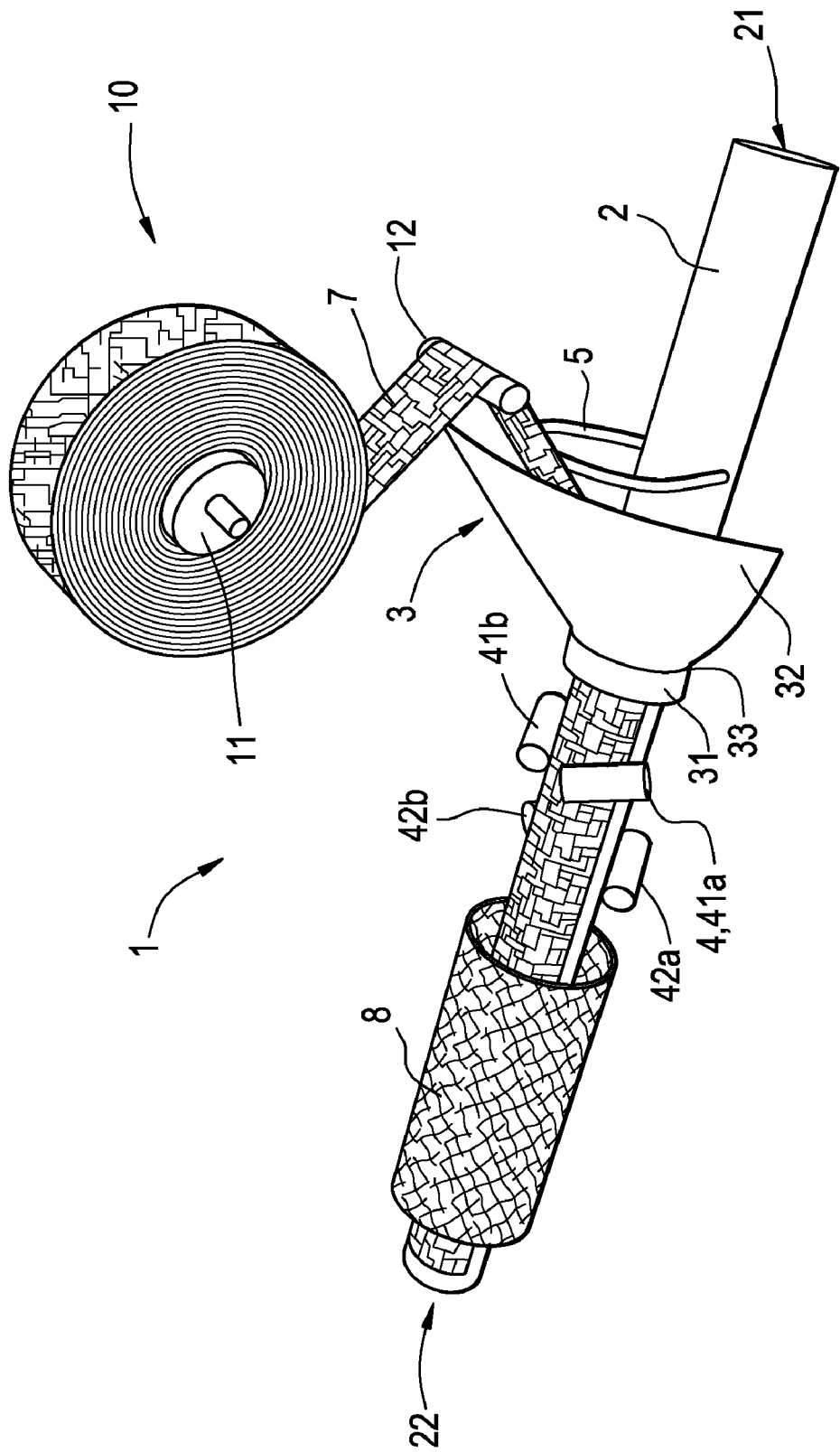
FIG. 1 shows a perspective view obliquely from above of an apparatus for stuffing a meat or sausage mass into a sausage skin.

The foregoing object of the invention is achieved by an apparatus for stuffing a pasty food into a tubular casing, the apparatus having a stuffing tube with an inlet end and an outlet end, on which a stock of tubular casing in shirred form is located, the apparatus comprising an applicator sleeve which is arranged between the inlet end and the outlet end and surrounds the stuffing tube about part or the complete circumference and is intended for one or more strips coated with transferable food additives, and wherein the stuffing tube and part of the applicator sleeve bound, and thus define, a gap which is open about part or the complete circumference.

It is essential for the innovation to allow the strip with the additives which can be transferred to the particular food to run into the casing while the tubular casing is being unshirred and stuffed with the food. The strip is fixed in place by the final closure of the meat, sausage or cheese casing, expediently a wire or plastic clip. During the further processing, for example by blanching, boiling and/or smoking, the strip remains between the casing and the surface of the food. During the further processing, at least some of the spices or, in general, the food additives are transferred to the surface of the food.

Advantageous developments of the innovation are reproduced in the dependent claims and are distinguished in that:

the gap between the applicator sleeve and the stuffing tube has a width of 0.5 to 2 cm, preferably of 0.8 to 1.5 cm, in the radial direction with respect to the stuffing tube;

the gap between the applicator sleeve and the stuffing tube extends over a length of 0.5 to 10 cm, preferably 1 to 5 cm, and in particular 1 to 2 cm, in the direction of a longitudinal axis of the stuffing tube;

the applicator sleeve has a first and second region, the first region being designed as a tube about part or the complete circumference and the second region being designed in the manner of a partial or complete envelope of a cone;

the applicator sleeve is single-piece of design and a transition region connecting the first and second region has a continuous contour;

the apparatus has one or more curved guide clips for coupling the strips to the guide sleeve;

the apparatus has one or more magazines for the strips;

the magazines comprise a reel for accommodating and providing the strips;

the magazines comprise guide rollers for coupling the strips to the applicator sleeve;

the apparatus has at least one applicator roller arranged between the applicator sleeve and the outlet end, and an elastic element is provided which presses the applicator roller frictionally against the stuffing tube in such a manner that the strip can be guided between the applicator roller and the stuffing tube;

the elastic element is designed as a spring;

the apparatus has a pair of applicator rollers with axes of rotation which are directed away from the longitudinal axis of the stuffing tube in a substantially V-shaped manner such that each of the applicator rollers deflects a half of the strip away from the longitudinal axis of the stuffing tube, and the strip is pulled in tension in the circumferential direction of the stuffing tube to avoid the formation of wrinkles in the strip; and the apparatus has a pair of applicator rollers with axes of rotation which are oriented toward the longitudinal axis of the stuffing tube in a substantially V-shaped manner such that each of the applicator rollers deflects a half of the strip toward the longitudinal axis of the stuffing tube, and the strip is pulled in tension in the circumferential direction of the stuffing tube to avoid the formation of wrinkles in the strip.

Two or more strips having identical or differently colored food additives can also be used, for example a strip with paprika powder and one with freeze-dried and ground parsley. A sausage having a red and a green strip is obtained in this manner. The (spice-containing) strips are suitable in particular for the production of sliced products. In this case, the casing and, if comprised of non-edible material, also the carrier material of the spice-containing strip are removed. The sausage is then cut into slices. The sliced product then passes, as customary, to the market in a plastic film pack.

The meat, sausage or cheese products in the casing with the (spice-containing) strips on the inside can also be dispensed directly to the final consumer. In this case, the carrier of the spice-containing strip is expediently comprised of edible, preferably also water-soluble, material, in particular of gelatin and/or collagen. The positioning of the strip or of the strips is advantageously co-ordinated with a printed image applied to the outer side of the casing which in this case is transparent. Since the food additives are generally colored, the printed image can thus be provided with a color background.

The casing itself may be comprised of any material. It is preferably comprised of thermoplastic and is formed in one or more layers.

FIG. 1 shows an apparatus 1 according to the invention with a stuffing tube 2 which is used to inject a meat or sausage mass into a sausage skin section (not shown in FIG. 1). The stuffing tube 2 has an inlet end 21 to which the feeding-in device for a meat or sausage mass is connected. At the opposite end of the stuffing tube 2, at the outlet end 22, the sausage skin section to be stuffed is held ready with a closed end, the sausage skin material 8 required for the individual sausage skin section being automatically pulled off from the stuffing tube 2 as the stuffing operation progresses. Accordingly, a stock of the sausage skin material 8 is situated on the outer circumference of the stuffing tube 2 which lies from the outlet end 22 toward the inlet end 21. In order to be able to provide a sufficiently large stock, the tubular casing 8 is shirred. By means of a suitable brake (not illustrated in FIG. 1), as the sausage skin section which is being pulled off is being stuffed, the sausage skin material 8 is transferred into a stretched position and, when the designated length of the strand of meat or sausage mass is reached, is tied off. This can take place automatically by attaching a clip which is used at the same time to close the front end of the next sausage skin section to be stuffed.

A strip 7 is placed into the particular sausage skin section next to the meat or sausage mass. The strip 7 is a carrier band made of paper, cellulose, plastic, textile material, collagen and/or gelatin which is coated with a food additive or a mixture of various such substances, in particular with spices, such as pepper (in the form of whole peppercorns, in piece form and/or finely ground), paprika powder, dried or fresh herbs, liquid smoke, dry smoke, plant extracts and the like. The carrier band is preferably comprised of a water-soluble material which dissolves within a few days upon contact with the water- or fat-containing meat, sausage or cheese product such that only the additives originally located on the carrier band—preferably in strip form—can be seen on the surface of the food.

The strip 7 is stored in a magazine 10 in the form of a band stack (folded product) or in the form of a reel. In order to feed in the strip 7, if it is provided in the form of a reel, the magazine 10 is provided with a reel holder 11, in particular a rotatably mounted cylindrical shaft 11.

The strip 7 running out of the magazine 10 is coupled to the outer side of the stuffing tube 2 via one or more guide rollers 12, a curved guide clip 5 and an applicator sleeve 3. In this case, the strip 7 is guided in the longitudinal direction of the stuffing tube 2 at a shallow angle with respect to the lateral surface area of the stuffing tube 2 and substantially centered with respect to the stuffing tube 2 in the azimuthal direction. The term "centered" here means that an imaginary center line running centrally between the edges of the strip 7 is oriented substantially parallel to a longitudinal axis (see FIGS. 2 and 6) of the stuffing tube 2.

The applicator sleeve 3 has a first and second region (31, 32), the first region 31 being designed as a tube around part or the complete circumference and the second region 32 being designed in the manner of a partial or complete envelope of a cone. The applicator sleeve 3 is preferably formed as a single piece and is comprised of metal or plastic, the first region 31 being connected to the second region 32 by a transition region 33 having a continuous contour and a smooth inner side. The continuous contour and the smooth inner side of the transition region 33 ensure that the strip 7 slides along the applicator sleeve 3 in a manner virtually free from friction and the risk of the strip 7 tearing off is minimized.

In the first region 31, which is of convex or tubular design, the strip 7 is guided in the circular gap 6, which is an opening defined around about part or the complete circumference, between the stuffing tube 2 and the applicator sleeve 3. Due to fluctuations caused by the process or material, there is the risk here of the strip 7 being creased in the longitudinal direction.

Figure 8:
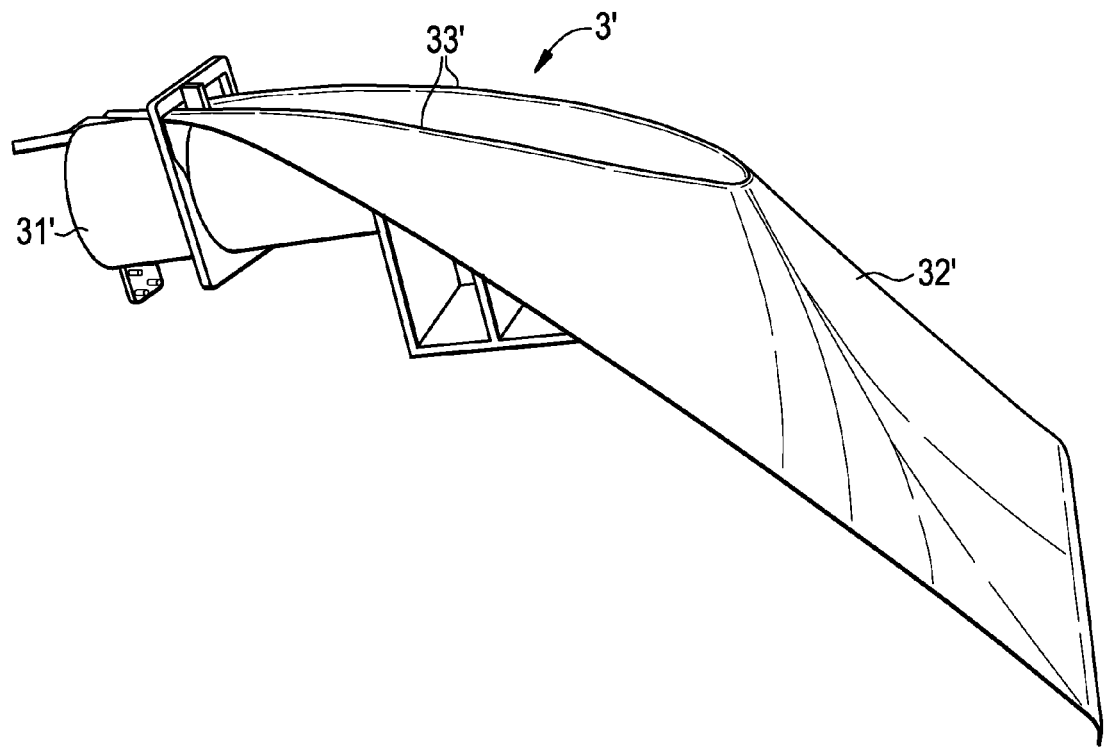
FIG. 8 shows a preferred configuration of the applicator sleeve.

A particularly preferred embodiment of an applicator sleeve 3' according to the invention with a first and second region (31', 32') is illustrated in FIG. 8, the second region 32' being designed concavely with respect to the first region 31'. The applicator sleeve 3' is expediently designed as a single piece and has a transition region 33' with a continuous contour, which connects the first region 31' to the second region 32'.

The strip 7 is guided and fed in on account of the tensile force acting thereon in the longitudinal direction because of the stuffing of the sausage skin. The longitudinally directed tensile force causes the strip 7 to fit closely against the concave contour of the second region 32', a tension being induced in the transverse direction and the strip 7 being pulled in tension and any longitudinal creases present thus being pulled smooth.

The convex-concave configuration of the first and second region (31', 32') and the resultantly induced transverse tension ensure that the strip 7 exits from the first region 31' in the desired tube shape closed about part or the complete circumference and without creases.

The apparatus 1 optionally comprises one or more applicator rollers (4, 41a, 41b, 42a, 42b). The applicator rollers (4, 41a, 41b, 42a, 42b) are mounted rotatably on spindles. The spindles of the applicator rollers are preferably held pivotally or in a linearly displaceable manner in rotary or sliding bearings and are pressed frictionally by means of elastic elements, in particular by means of springs, substantially in the radial direction against the outer side of the stuffing tube 2 such that the strip 7 can be guided between the applicator rollers (4, 41a, 41b, 42a, 42b) and the stuffing tube 2. The spindles of the applicator rollers and the associated holders and springs are not illustrated in FIG. 1. A multiplicity of mechanical arrangements suitable for this purpose is known in the prior art, it being readily possible to assemble a usable structure from commercially available components.

The applicator sleeve 3, the guide clip 5 and the applicator rollers (4, 41a, 41b, 42a, 42b) are mounted on a holder (not shown in FIG. 1) which is fixed on the stuffing tube 2 in the region of the inlet end 21. The holder is expediently designed as a rail or frame which is manufactured from a stable material, such as stainless steel. As an alternative to the installation on the filling tube 2, the holder may also be fastened to a stuffing station connected to the stuffing tube 2.

Figure 2:
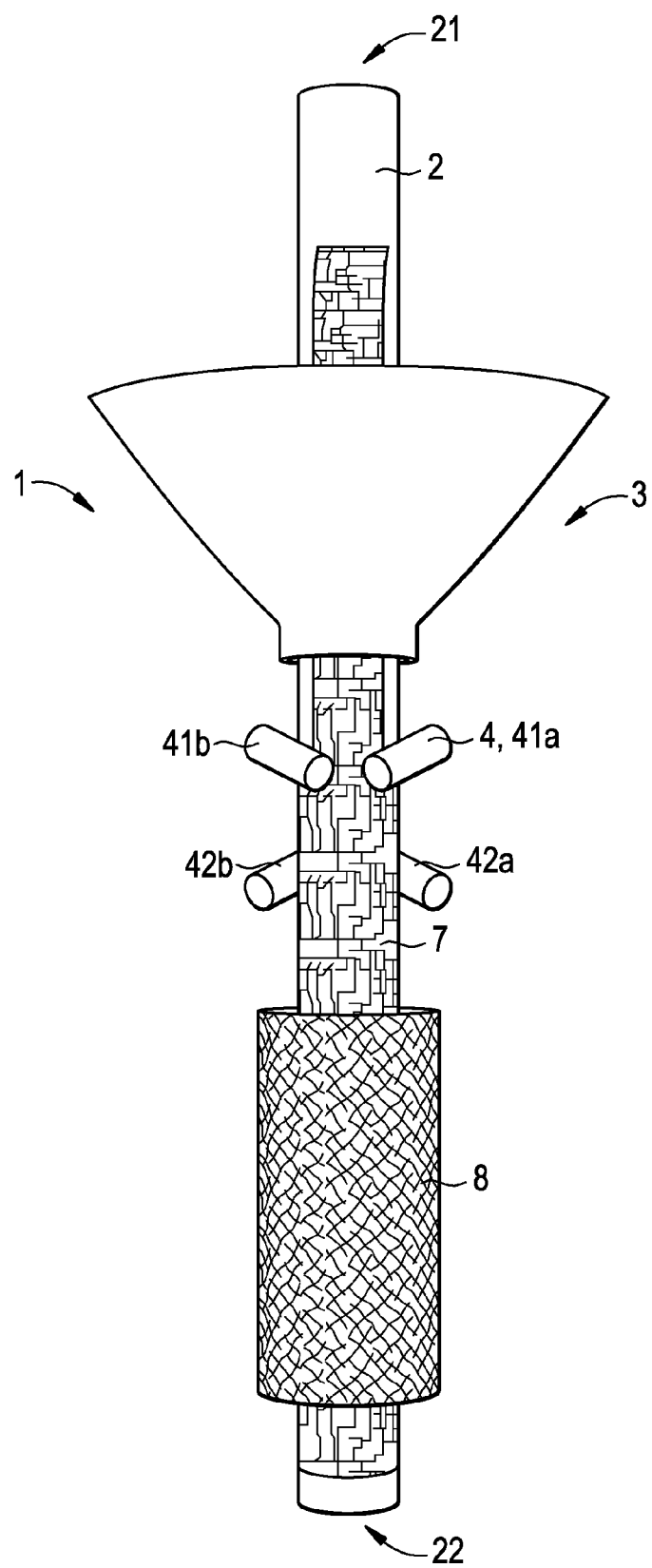
FIG. 2 shows a top view of the upper and lower sides of the apparatus.
Figure 3:
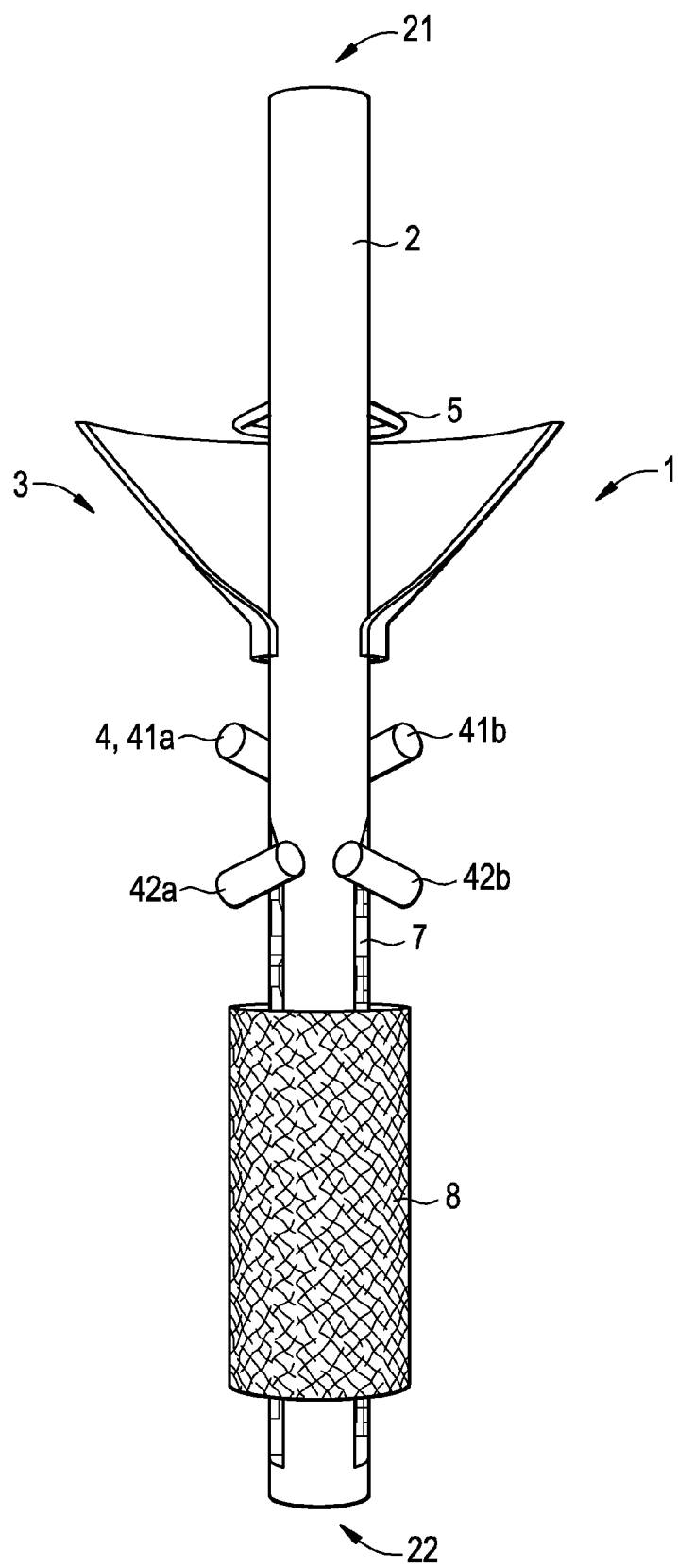
FIG. 3 also shows a top view of the upper and lower sides of the apparatus.

FIGS. 2 and 3 show top views of the upper side and the lower side of the apparatus 1, the "centered" arrangement of the strip 7 relative to the stuffing tube 2 being readily visible. The reference numbers correspond to those in FIG. 1.

Figure 4:
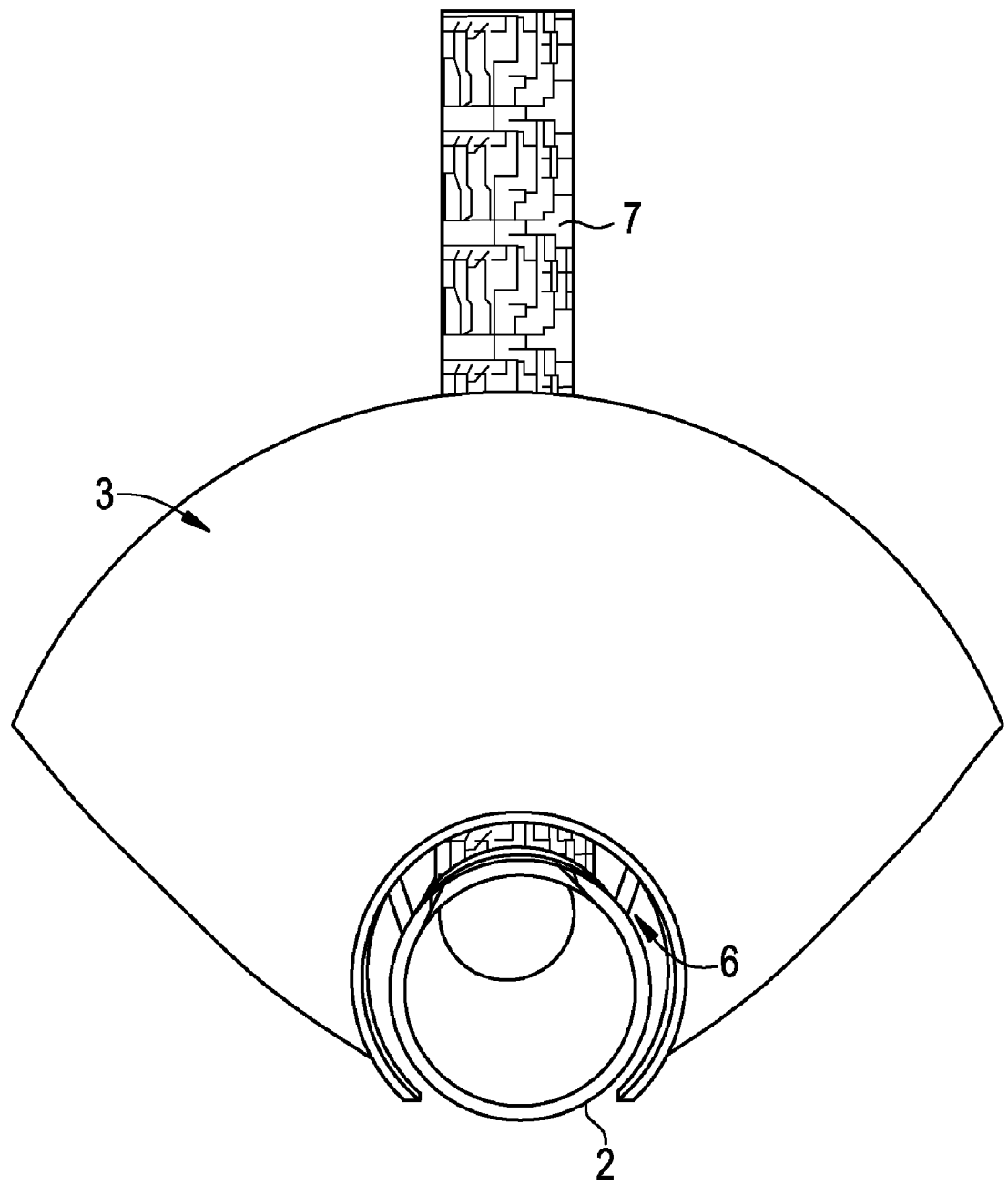
FIG. 4 shows an enlarged sectional view of part of the apparatus.

FIG. 4 reproduces a sectional view of the stuffing tube 2 and the applicator sleeve 3. A gap 6 is bounded and thus defined by the outer side of the stuffing tube 2 and the inner side of the region 31 of the applicator sleeve 3. The gap 6 extends over part or the complete circumference of the stuffing tube 2, has a clearance width of 0.5 to 10 cm, preferably of 0.7 to 2.0 cm, particularly preferably of 0.8 to 1.5 cm, in the radial direction with respect to the stuffing tube 2 and is open about part or the complete circumference.

Figure 5:
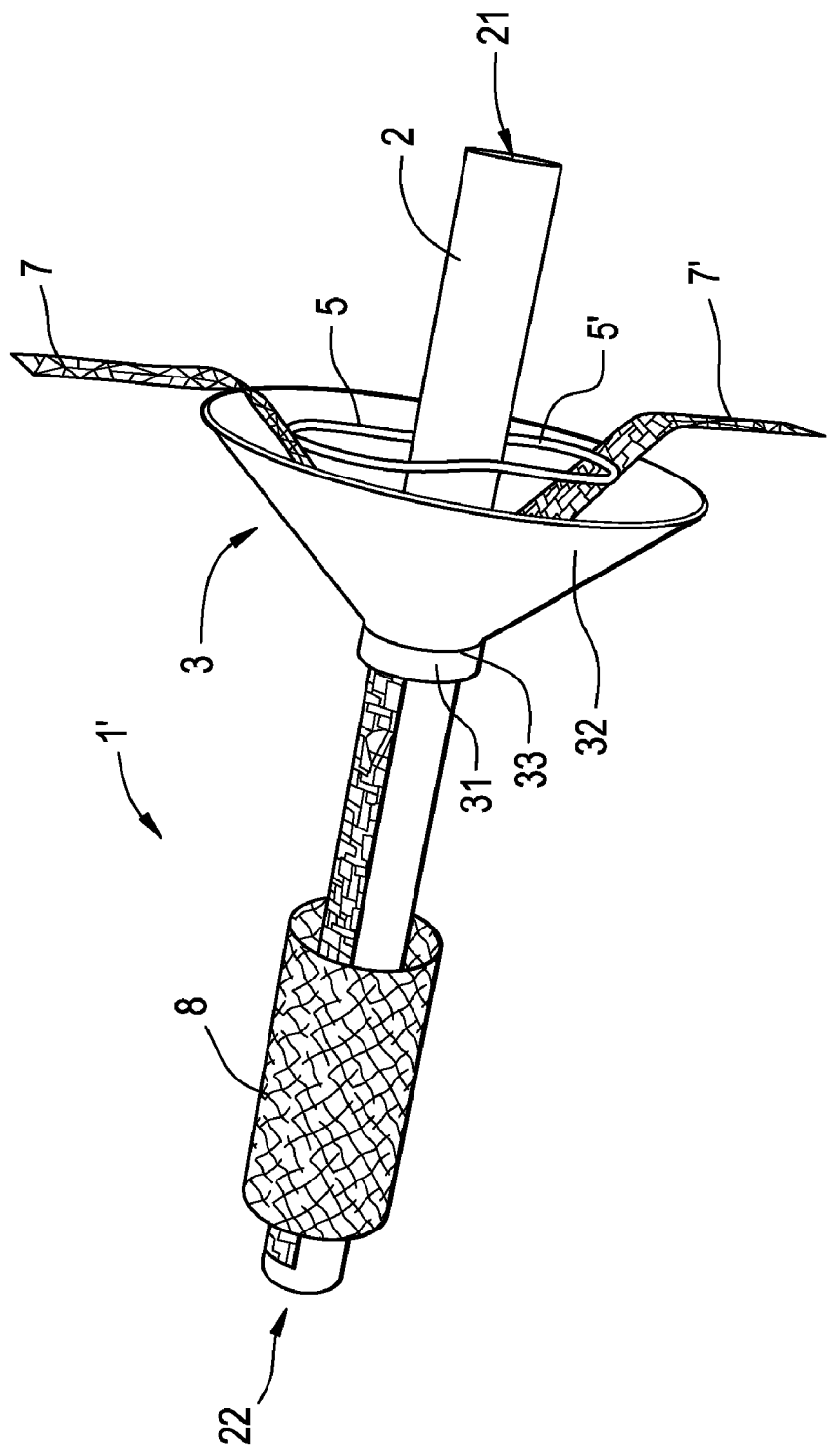
FIG. 5 shows a perspective view of part of the apparatus with an upper and a lower pair of rollers.

FIG. 5 shows another preferred embodiment 1' of the apparatus according to the invention, in which a first strip 7 is fed in on the upper side of the stuffing tube 2 and a second strip 7' is fed in on the lower side of the stuffing tube 2. The apparatus 1' makes it possible to provide a meat or sausage product with two strips (7, 7') which are coated and/or impregnated with differently colored additions, for example black and red pepper.

Figure 6:
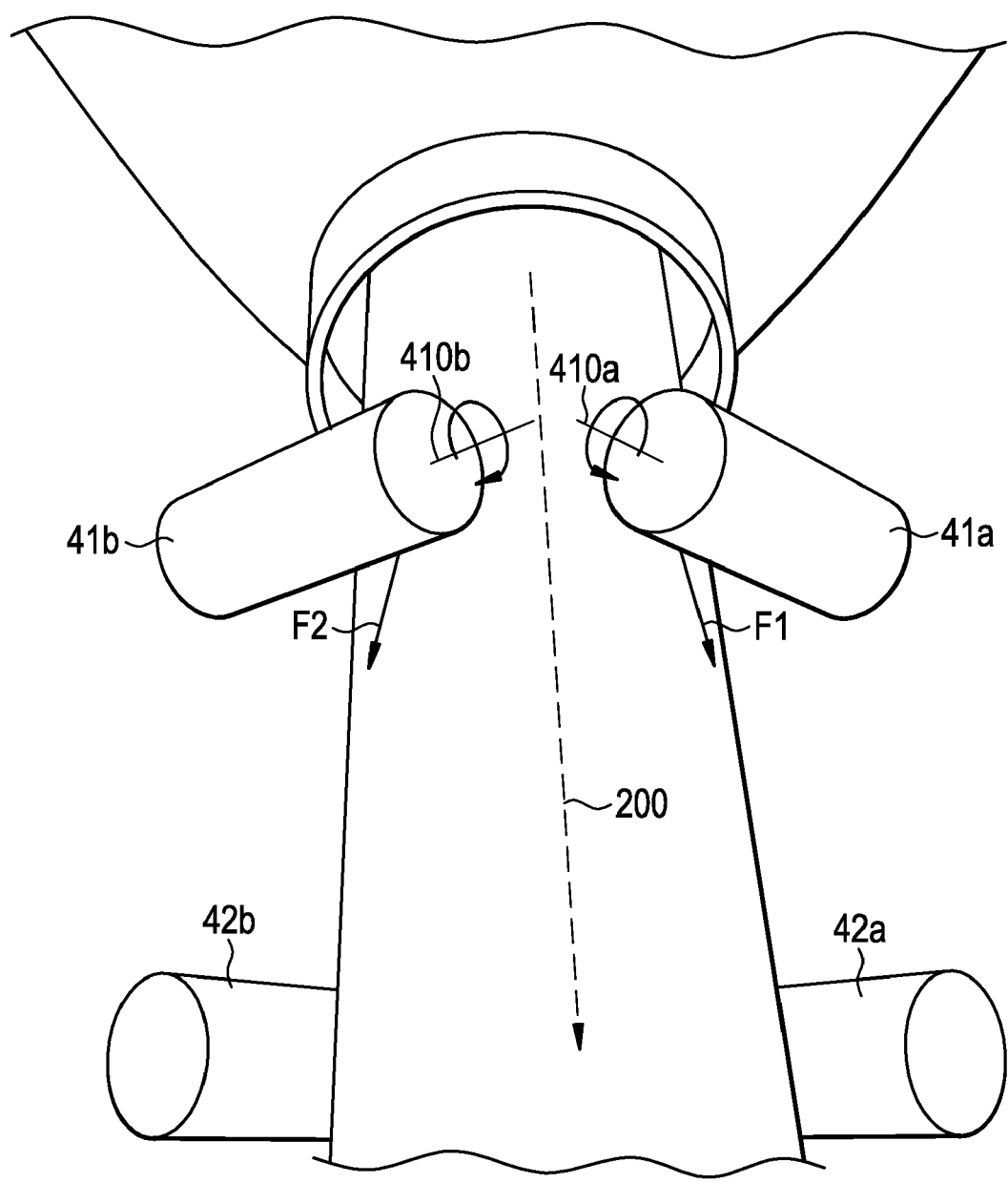
FIG. 6 also shows a perspective view of part of the apparatus with an upper and a lower pair of rollers.
Figure 7:
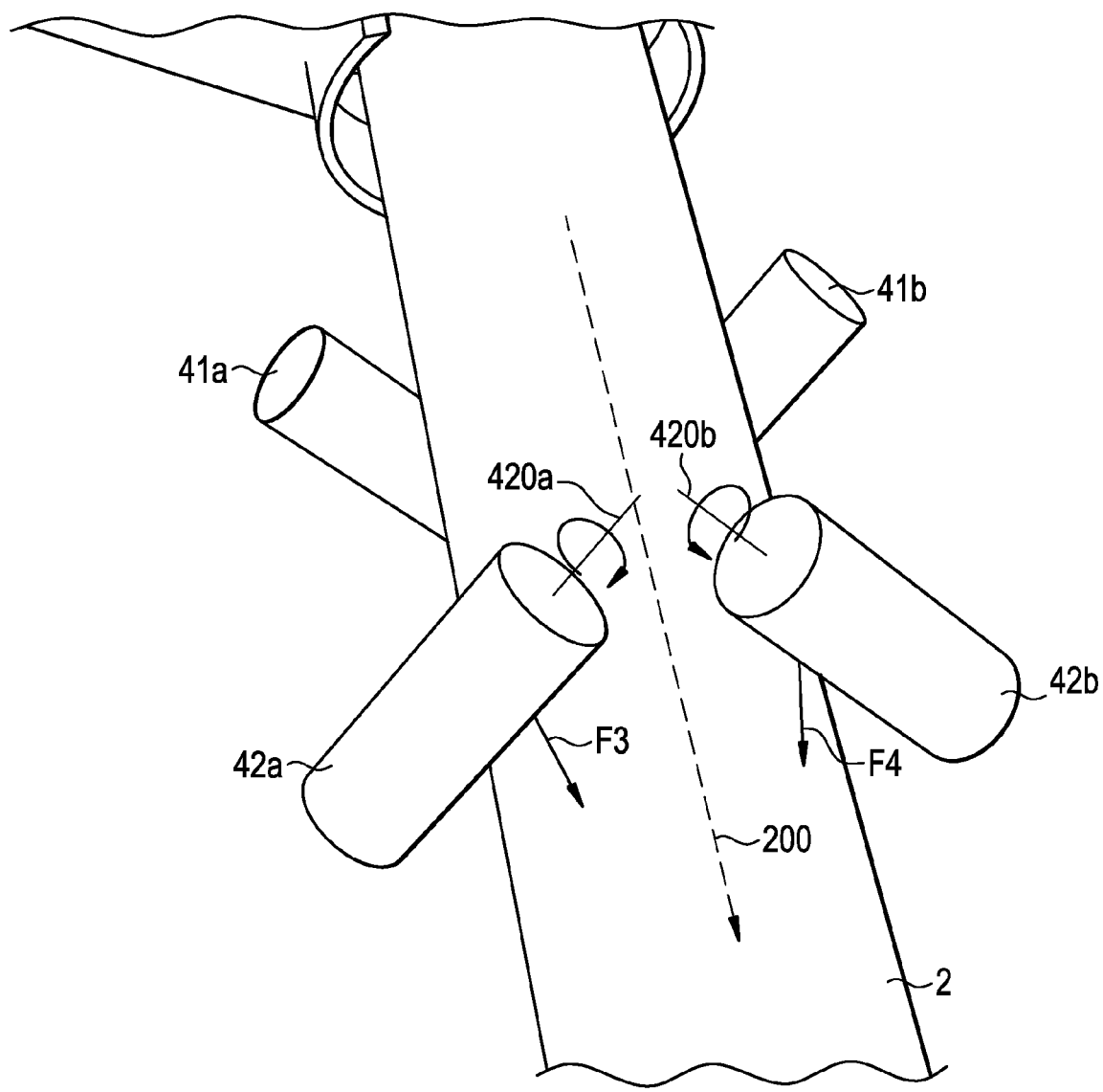
FIG. 7 shows a perspective view of an apparatus for feeding in two strips.

FIGS. 6 and 7 reproduce perspective detailed views of the applicator rollers (41a, 41b, 42a, 42b). The applicator rollers (41a, 41b) having axes of rotation (410a, 410b) are arranged on the upper side of the stuffing tube 2, the axes of rotation (410a, 410b) being oriented with respect to a longitudinal axis 200 of the stuffing tube 2 in a substantially V-shaped manner. Owing to said V-shaped orientation of the axes of rotation (410a, 410b), each of the applicator rollers (41a, 41b) deflects a half of the strip 7 outward from the longitudinal axis 200 of the stuffing tube 2. As indicated in FIG. 6 by arrows F1 and F2, the applicator rollers (41a, 41b) in this case exert tensile forces pointing outward from the longitudinal axis 200 on the strip 7 in the circumferential direction of the stuffing tube 2.

As illustrated in FIG. 7, the applicator rollers (42a, 42b) having axes of rotation (420a, 420b) are arranged on the lower side of the stuffing tube 2 behind the applicator rollers (410a, 410b) in the stuffing direction—i.e. in the direction from the inlet end 21 to the outlet end 22, the axes of rotation (420a, 420b) likewise being oriented with respect to the longitudinal axis 200 of the stuffing tube 2 in a substantially V-shaped manner. In contrast to the applicator rollers (41a, 41b), the applicator rollers (42a, 42b) are oriented in such a manner that they each deflect a half of the strip 7 toward the longitudinal axis 200 of the stuffing tube 2. This is indicated in FIG. 7 by arrows F3 and F4.

With the aid of the applicator rollers (41a, 41b, 42a, 42b), a partial or complete covering with the strip 7 is brought about in the circumferential direction of the stuffing tube 2 in such a manner that the meat or sausage mass stuffed into the sausage skin material 8 is partially or completely encased by the strip 7. In addition, creases which may be produced in the strip 7 during packing or winding onto or unwinding from a reel are smoothed out.

That which is claimed is:

1. An apparatus for stuffing a pasty food into a tubular casing, the apparatus having a stuffing tube with an inlet end and an outlet end, on which a stock of the casing in shirred form is located, the apparatus comprising an applicator sleeve arranged between the inlet end and the outlet end of the stuffing tube that surrounds the stuffing tube about part or the complete circumference and applies one or more strips coated with a food additive or with food additives,
   wherein the stuffing tube and part of the applicator sleeve define a gap which extends about part or the complete circumference
   and the applicator sleeve has a first and second region, the first region being designed as a tube around part or the complete circumference and the second region being designed in the manner of a partial or complete envelope of a cone.

2. The apparatus as claimed in claim 1, wherein the gap has a width of 0.5 to 10 cm in the radial direction with respect to the stuffing tube.

3. The apparatus as claimed in claim 1, wherein the gap between the applicator sleeve and the stuffing tube extends over a length of 0.5 to 10 cm in the direction of a longitudinal axis of the stuffing tube.

4. The apparatus as claimed in claim 1, wherein the second region is designed concavely with respect to the first region.

5. The apparatus as claimed in claim 1, wherein the applicator sleeve is of single-piece design and a transition region connecting the first and second region has a continuous contour.

6. The apparatus as claimed in claim 1, wherein the apparatus further comprises one or more magazines for the strips.

7. The apparatus as claimed in claim 6, wherein the magazines comprise a reel holder for accommodating and unwinding the strips in the form of a reel.

8. The apparatus as claimed in claim 6, wherein the magazines comprise guide rollers for coupling the strips to the applicator sleeve.

9. The apparatus as claimed in claim 2, wherein the gap has a width of 0.7 to 2.0 cm in the radial direction with respect to the stuffing tube.

10. The apparatus as claimed in claim 2, wherein the gap has a width of 0.8 to 1.5 cm in the radial direction with respect to the stuffing tube.

11. The apparatus as claimed in claim 3, wherein the gap between the applicator sleeve and the stuffing tube extends over a length of 1 to 5 cm in the direction of a longitudinal axis of the stuffing tube.

12. The apparatus as claimed in claim 3, wherein the gap between the applicator sleeve and the stuffing tube extends over a length of 1 to 2 cm in the direction of a longitudinal axis of the stuffing tube.

13. An apparatus for stuffing a pasty food into a tubular casing, the apparatus having a stuffing tube with an inlet end and an outlet end, on which a stock of the casing in shirred form is located, the apparatus comprising an applicator sleeve arranged between the inlet end and the outlet end of the stuffing tube that surrounds the stuffing tube about part or the complete circumference and applies one or more strips coated with a food additive or with food additives,
   wherein the stuffing tube and part of the applicator sleeve define a gap which extends about part or the complete circumference and the apparatus further comprises one or more curved guide clips for coupling the strips to the guide sleeve.

14. An apparatus for stuffing a pasty food into a tubular casing, the apparatus having a stuffing tube with an inlet end and an outlet end, on which a stock of the casing in shirred form is located, the apparatus comprising an applicator sleeve arranged between the inlet end and the outlet end of the stuffing tube that surrounds the stuffing tube about part or the complete circumference and applies one or more strips coated with a food additive or with food additives,
   wherein the stuffing tube and part of the applicator sleeve define a gap which extends about part or the complete circumference and
   the apparatus has at least one applicator roller arranged between the applicator sleeve and the outlet end, and an elastic element is provided which presses the applicator roller frictionally against the stuffing tube in such a manner that the strip can be guided between the applicator roller and the stuffing tube.

15. The apparatus as claimed in claim 14, wherein the elastic element is a spring.

16. The apparatus as claimed in claim 14, wherein the apparatus has a pair of applicator rollers with axes of rotation which are directed away from the longitudinal axis of the stuffing tube in a substantially V-shaped manner such that each of the applicator rollers deflects a half of the strip away from the longitudinal axis of the stuffing tube, and the strip is pulled in tension in the circumferential direction of the stuffing tube.

17. The apparatus as claimed in claim 16, wherein the applicator comprises a further pair of applicator rollers with axes of rotation which are oriented toward the longitudinal axis of the stuffing tube in a substantially V-shaped manner such that each of the applicator rollers deflects a half of the strip toward the longitudinal axis of the stuffing tube, and the strip is pulled in tension in the circumferential direction of the stuffing tube.

\* \* \* \* \*